Oct. 6, 1970  R. K. SUTZ  3,532,290
CONVERTIBLE SPORTS FISHING REEL
Filed Feb. 18, 1969  2 Sheets-Sheet 1
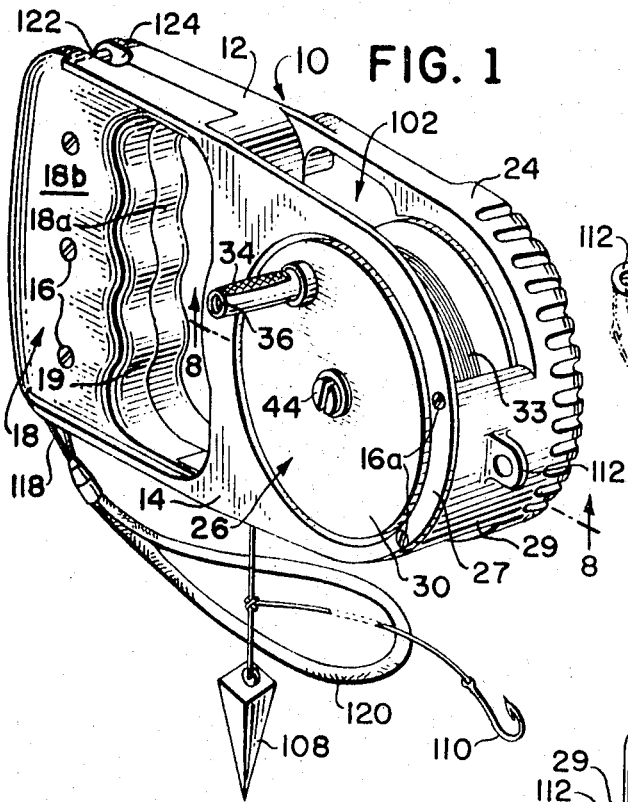
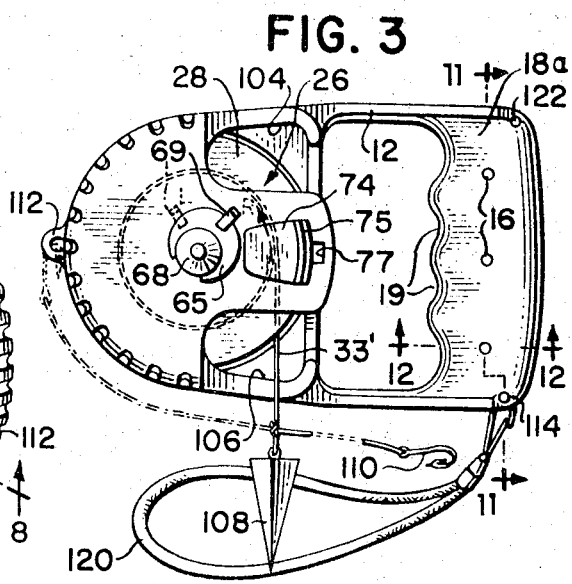
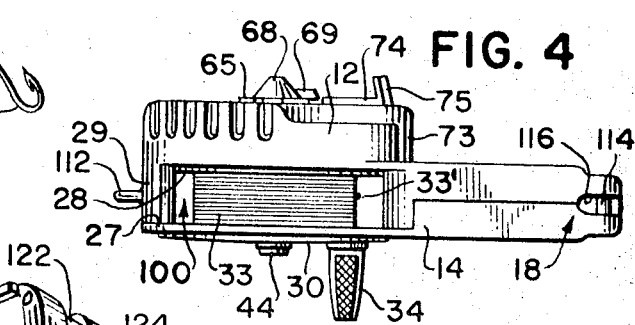
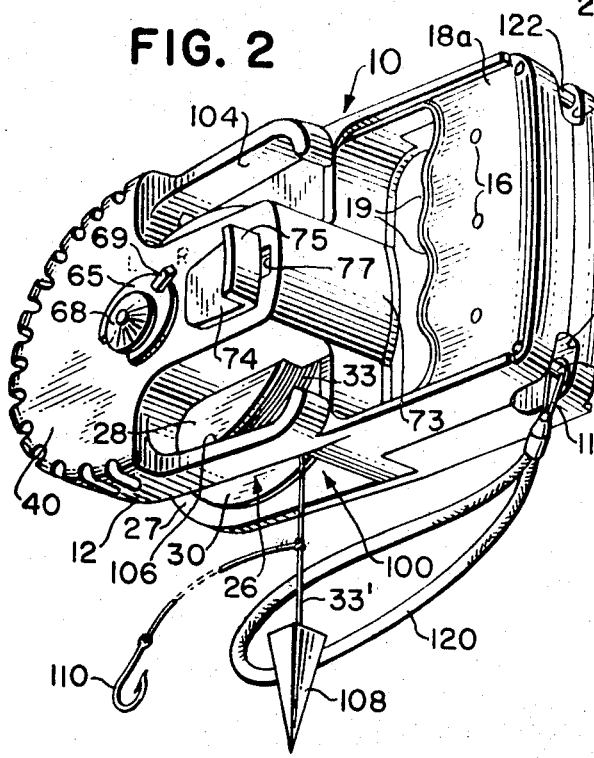
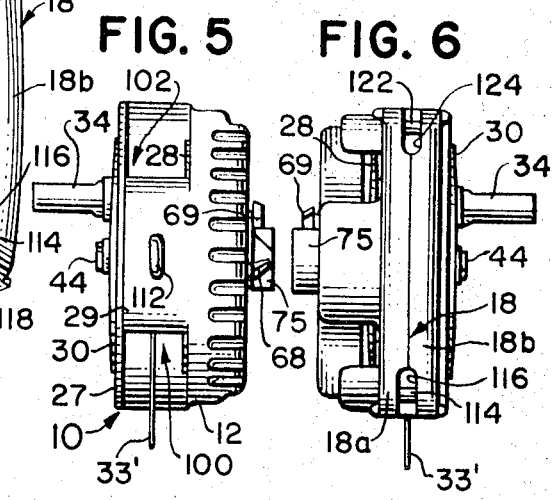
INVENTOR:
RICHARD K. SUTZ
BY J. B. Burke
ATTORNEY Oct. 6, 1970  R. K. SUTZ  3,532,290
CONVERTIBLE SPORTS FISHING REEL
Filed Feb. 18, 1969  2 Sheets-Sheet 2
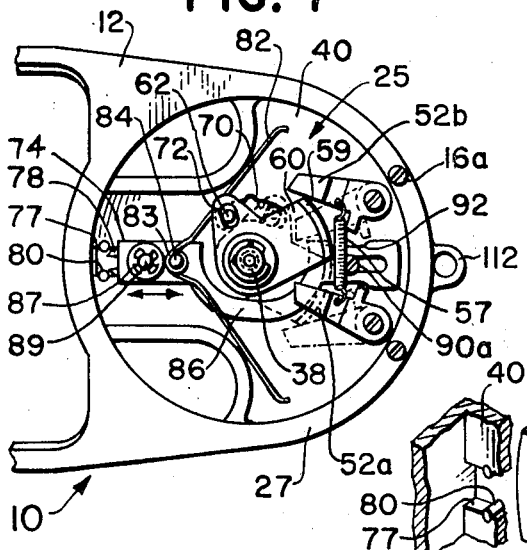
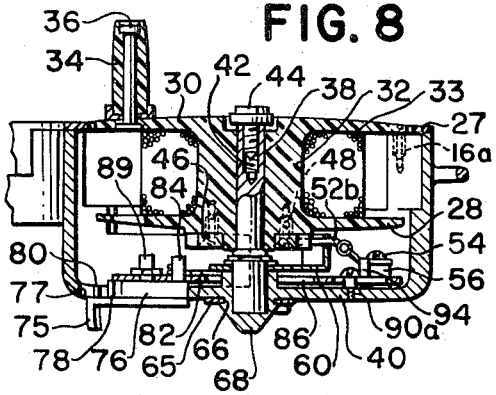
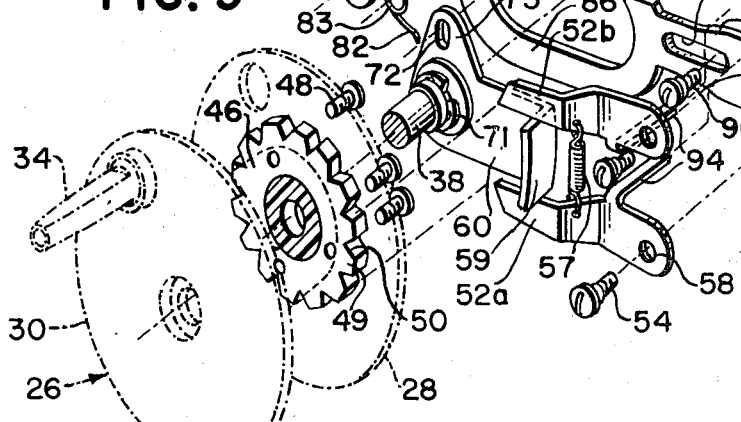
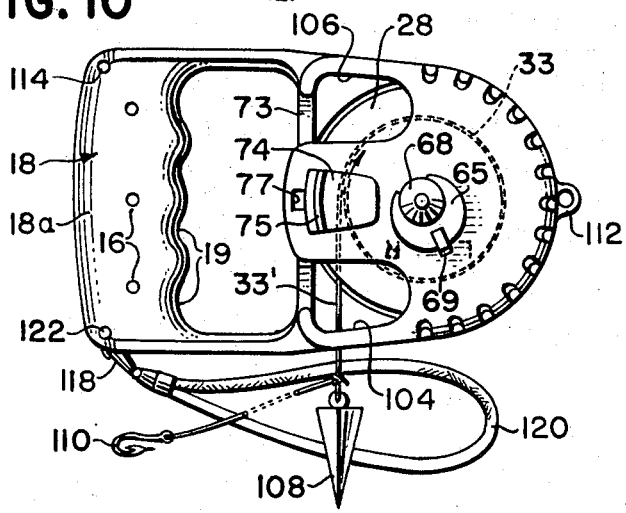
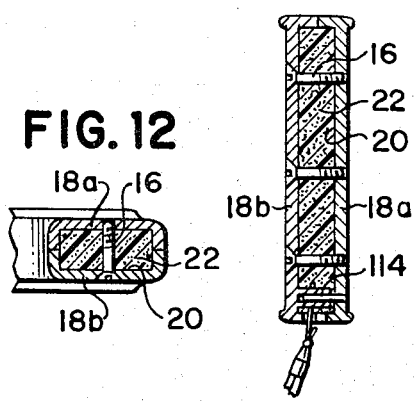
INVENTOR:
RICHARD K. SUTZ
BY J. B. Burke
ATTORNEY.

United States Patent Office 3,532,290
Patented Oct. 6, 1970

3,532,290
CONVERTIBLE SPORTS FISHING REEL
Richard K. Sutz, 5800 Arlington Ave.,
Riverdale, N.Y. 10471
Continuation-in-part of applications Ser. No. 690,246,
Dec. 13, 1967, and Ser. No. 775,594, Nov. 14, 1968.
This application Feb. 18, 1969, Ser. No. 800,173
Int. Cl. B65h 17/44
U.S. Cl. 242—99
10 Claims

ABSTRACT OF THE DISCLOSURE

This sports fishing reel has a frame in which is a rotatable spool. The frame has a handle at one end which can be grasped in either the right hand or left hand of a fisherman while he turns the spool with his other hand to retrieve the fishing line wound on the spool. A two-way ratchet in the reel cooperates with adjustable pawls so that the line can be retrieved by turning the spool. A finger controlled slide lever permits free rotation of the spool in playing out the line. Drag in playing out the line is controlled by finger pressure applied to either side of the spool.

---

This application is a continuation in part of my copending U.S. patent applications Ser. No. 690,246, filed Dec. 13, 1967, now Pat. No. 3,476,332 issued Nov. 4, 1969, and Ser. No. 775,594, filed Nov. 14, 1968.

This invention concerns improvements in a handline sports fishing reel specifically intended for use in water by scuba divers, snorklers and underwater swimmers, but also adapted for use by a fisherman while still fishing off a boat, pier or bridge, or while ice fishing, or while surf casting by hand from shore.

According to the invention the reel can be held in the left hand of the fisherman while with his right hand he turns the spool clockwise to retrieve the line. By rewinding the line in opposite direction on the spool the fisherman can invert the reel and hold it in his right hand while he again turns the spool clockwise, this time with the left hand, to retrieve the line. The clockwise direction of turning is always viewed from the right side of the reel. Such right or left hand retrieve capability has not heretofore been available in any hand held sports fishing reel. Alternate right or left hand retrieve operation is made possible by a two-way ratchet engaged by alternate pawls in the reel operated by a control knob.

Further according to the invention, there is provided a finger controlled slide which enables the line to be played out with free spooling. The frame of the reel is formed with openings exposing the spool on one side so that finger control of drag is possible at the side of the reel. The handle of the reel is hollow and may contain a buoyant filling, or it can be arranged with or without hinge means for use in storing fish hooks, flies, bait or other accessories.

The invention will be explained in further detail in connection with the drawings, wherein:

FIGS. 1 and 2 are perspective views showing opposite sides of the reel embodying the invention, the reel being arranged for holding it in the left hand with the right hand turning the spool to retrieve the line.

FIG. 3 is a reduced side elevational view of the reel.

FIG. 4 is a bottom plan view of the reel.

FIGS. 5 and 6 are front end and rear end elevational views respectively of the reel.

FIG. 7 is a fragmentary side view of the reel with spool removed.

FIG. 8 is a fragmentary sectional view taken on line 8—8 of FIG. 1.

FIG. 9 is an exploded perspective view of parts of the reel.

FIG. 10 is a side view of the reel shown arranged for holding in the right hand with the left hand turning the spool to retrieve the line.

FIGS. 11 and 12 are sectional views taken on lines 11—11 and 12—12 respectively of FIG. 3.

Referring now to the drawing, the reel has a frame 10 made of two molded light metal or plastic parts 12 and 14. The frame parts are shown held together by screws 16, 16a at opposite ends, but they could be arranged to snap together without use of screws, and with or without a hinge joining the parts. A handle 18 with finger grip indentations 19 is defined by rear end portions 18a and 18b of parts 12 and 14. These portions of the frame define a chamber 20 in the handle which can be filled with a buoyant, cellular material 22 so that the reel will float in water, or else the chamber can be left vacant for storing fish hooks and other accessories; see FIGS. 11 and 12.

The front portions 24 of frame part 12 define a cylindrical well 25 open at one side of the frame. Spool 26 fits rotatably into well 25. A ring-like portion 27 of frame part 14 abuts cylindrically curved wall portion 19 of frame part 12 and is held by screws 16a.

Spool 26 has two annular flanges 28, 30 integral with central hub 32 on which is wound line 33. The line is wound counterclockwise as viewed from the right side of the reel shown in FIG. 1. Handle 34 is secured rotatably by a pin 36 on flange 28 and extends laterally outward of the frame and spool. The spool is rotatably engaged on a stationary shaft 38 seated in side wall 40 of the frame. The shaft extends through bore 42 in hub 32. The spool is retained on the shaft by a screw 44 engaged on the outer end of shaft 38. On the outer side of flange 30, facing inwardly of well 25 toward side wall 40 is a ratchet wheel 46 secured by screws 48. The ratchet has teeth 49 defined by V-shaped grooves 50. The ratchet can turn with the spool in either one of two directions depending on which one of two pawls 52a or 52b is engaged with the ratchet wheel.

Pawls 52a and 52b are pivotally mounted by screws 54 engaged in holes 55 of bosses 56 on wall 40. The screws extend through holes 58 in ends of the pawls. The pawls are connected by a coil spring 57 which urges the pawls inwardly toward each other and against opposite edges of flange 59 at one end of a control lever 60; see FIG. 9. The control lever is turnable angularly on stationary shaft 38 by a pin 62 extending inwardly from a plate 65. Plate 65 is engaged in a groove 66 formed in a knob-like projection 68 on the outer side of wall 40. A fingerpiece or knob 69 on plate 65 enables it to be turned angularly in its plane on shaft 38. Pin 62 extends through arcuate slot 70 in wall 40 and is engaged in a slot 72 formed in short arm 73 of lever 60. A C-ring 71 holds lever 60 on shaft 38.

A finger operated slide member 74 is mounted on the outer side of wall 40. This slide member has an outwardly extending flange 75. A laterally extending offset portion 76 of the slide member is slidably engaged in a slot 77 formed in side wall 40. Flexible fingers 78 are formed at the end of slide portion 76. These fingers releasably engage on stop or catch abutments 80 located near one end of slot 77 to hold the slide member 74 retracted against tension in V-spring 82. Spring 82 has a coiled loop 83 at its apex engaged on pin 84 secured to slide portion 76. Pin 84 extends through hole 85 in a slide bar 86. The slide bar is attached to slider 74 by lock washer 87 engaged on pin 89 integral with the slider and extending through hole 91 in bar 86. The slide bar has a slot 88 at its forward end slidably engaging screw 90a seated in hole 90 in wall 40. Two slanted flaring camming edges 92 are formed at opposite edges of bar 86. These camming edges engage fingers 94 extending laterally from pawls 52a, 52b so that both pawls will be pivoted away from the teeth of the ratchet wheel when the slide bar is pulled to the left as viewed in FIGS. 7 and 9. When the slide bar is released from catch members 80 and moves all the way to the right as viewed in FIG. 7, then both pawls can engage the ratchet wheel. However only one pawl will engage the ratchet wheel at a time depending on the setting of fingerpiece 69 at R or L position marked on side wall 40. For a setting at R position, lower pawl 52a engages the ratchet wheel while pawl 52b is held out of the way by flange 59 as shown by solid lines in FIG. 7. For a setting at L position, the other pawl 52b engages the ratchet wheel and pawl 52a is held out of the way as indicated by dotted lines in FIG. 7.

FIGS. 1, 2, 3 and 7 clearly show the reel arranged for right hand retrieve. The line 33 is wound counterclockwise as above mentioned. The fisherman retrieves or winds up the line by turning the spool clockwise with his right hand while he grasps handle 18 with his left hand. FIGS. 2 and 3 show fingerpiece 69 set at R position for right hand retrieving of the line. The spool is turned clockwise during retrieving as viewed from the right side of the reel. This arrangement locates the vertical part 33' of line 33 close to the center of gravity of the reel at inner wall 73. While retrieving the line, slide member 74 is pushed forwardly all the way as indicated in FIG. 2. Pawl 52a is engaged with ratchet wheel 46 as indicated in FIG. 7. Thus the spool can be turned clockwise to wind up the line while pawl 52a yields as the ratchet wheel turns slidably past the pawl. The spool is prevented from turning counterclockwise to play out the line by engagement of pawl 52a with one slanted edge of the ratchet teeth.

The vertical part 33' of line 33 passes through an opening 100 at the underside of the frame defined between walls 29 and 73 and opposite sides of frame parts 12 and 14. Another similar opening 102 is defined at the upper side of the frame for use during left hand retrieving described below. Two further openings 104 and 106 are formed in frame part 12 at wall 40 to expose portions of flange 28 of the spool.

When the reel is in the position shown in FIG. 3, the fisherman can grip the handle with the third, fourth and fifth fingers of his left hand while his left index finger is free. If the fisherman then fully retracts slider 74 to the locked position, extreme left as viewed in FIG. 7, both pawls 52a, 52b will be out of engagement with ratchet 46 and spool 26 will turn freely to play out the line which is pulled down by weight 108. The slider is retracted by use of the left index finger which is then replaced on the handgrip after the slider is locked in position. The fisherman can retract slider 74 only partially to release the pawls from the ratchet but with the slider out of engagement with catch abutments 80. The slider will then be held against tension in spring 82 and can at any time be released by the left forefinger or index finger to instantly reengage the pawls with the ratchet and stop playing out of the line.

When the slider is retracted so that the line is played out freely, the fisherman can insert his left forefinger through frame opening 104 to engage frictionally the exposed side of the spool at flange 28. By varying finger pressure, the fisherman can control drag or restricted playing out of the line.

Once a fish is engaged on hook 110, the fisherman will push slide member 75 forwardly by means of his left index finger, from the locked position. Slide bar 86 will snap forwardly to the position of FIG. 7. Pawl 52a will engage with the ratchet to prevent further playing out of the line. Now the fisherman can retrieve or wind up the line by turning spool 26 with his right hand clockwise as viewed from the right side of the reel in FIG. 1. Pawl 52a will prevent reverse counterclockwise turning of the spool regardless of the load on the line.

When the line is fully retrieved, hook 110 can be engaged in eye 112 as indicated by dotted lines in FIG. 3. A pin 114 is provided at the lower rear corner of the frame in recess 116 to engage snap hook 118 of a wrist strap 120. A similar pin 122 is provided in recess 124 at the upper rear corner of the frame.

As mentioned above, the reel is held in either the right or left hand depending on the preference of the fisherman. The decision for right hand retrieving (reel held in the left hand) or left hand retrieving (reel held in the right hand) must be made by the fisherman prior to actual use so that the direction in which he winds the line on the spool will permit retrieval upon clockwise rotation of the spool.

FIG. 10 illustrates the arrangement of the reel for left hand retrieving with right hand holding the reel. The reel is inverted from its position in FIGS. 1–3. Line 33 is rewound in opposite direction on the spool from its winding in FIGS. 1–3, but the line is still wound counterclockwise as viewed from the right side of the reel because the reel is now inverted. The straight free part 33' of the line is again located close to wall 73 but this time extends through opening 102 in the reel. Fingerpiece 69 is reset to L position. This turns lever 60 placing pawl 52b against the ratchet while pawl 52a is held deflected by flange 59. The wrist strap 120 is removed from pin 114 and is reengaged on pin 122.

Operation of the reel is basically the same for left hand retrieving as described above for right hand retrieving. The fisherman receives the line by turning the spool clockwise as viewed from the right side of the inverted reel which is grasped in his right hand. The fisherman inserts his right index finger thorugh frame opening 106 to engage flange 28 of the spool for manually controlling drag when slider 74 is partially or fully retracted to the left as viewed in FIG. 10. Retraction of the slider releases the spool for free turning but this time pawl 52b is moved away from the ratchet by flange 59. Pawl 52a remains deflected from the ratchet due to the positioning of fingerpiece 69 at position L.

From the foregoing it will be apparent that a fisherman has the option of right hand or left hand retrieve of the line. Furthermore he has instant control of drag by finger pressure on the spool. The frame is so arranged with frame parts 12 and 14 enclosing sides of the spool that the line cannot jump free of the spool. The large openings 100 and 102 in the reel permit full free movement of the line on and off the spool.

A most important feature of the invention is the arrangement whereby the reel is held upright in a vertical plane in the left hand for right hand retrieving, and the reel is inverted to upside-down position and is held in the right hand for left hand retrieving.

What is claimed is:
1. A reel for sport fishing, comprising:
 a general rectangular frame;
 a handle at one end of the frame for gripping by either hand of a fisherman to hold the frame in a vertical plane;
 a spool rotatably mounted on a horizontal axis in said frame at the other end thereof for storing and playing out a fishing line;
 ratchet mean in the frame for locking the spool against rotation to prevent playing out the line; and
 a control member on the frame operatively arranged to unlock the spool for free turning, said control member being operably by the forefinger of the hand gripping the handle,
 said frame having lateral openings exposing the spool for frictional engagement by said forefinger to apply braking drag thereto to restrict turning of the spool in playing out the line, whereby the frame will be disposed in upright position when one hand is holding the handle and the frame will be disposed in upside-down position when the other hand is holding the handle.

2. A reel as defined by claim 1, wherein the frame has other openings at top and bottom thereof for passing the line therethrough when the reel is in upright and upside-down positions respectively, whereby the line can be so wound on the spool that the spool will always turn in clockwise direction as viewed from one side of the reel to retrieve the line, while the line always passes close to the center of gravity of the reel in passing through either one of said other openings.

3. A reel as defined by claim 1, wherein the frame is formed of two separable frame parts, said parts being arranged to enclose the spool so that the line cannot jump laterally off the spool.

4. A reel as defined by claim 3, wherein the handle-defined by the frame parts is hollow for storage purposes and to render the reel buoyant in water when the handle is filled with buoyant material.

5. A reel for sport fishing as defined in claim 1, wherein said ratchet means comprises a ratchet wheel carried by the spool; two pawls pivotally disposed in the frame at circumferentially spaced positions adjacent the ratchet wheel, said ratchet wheel having teeth defined by V-shaped grooves and arranged so that one pawl will prevent rotation of the ratchet wheel in one direction while the other pawl will prevent rotation of the ratchet wheel in the opposite direction; lever means disposed to hold either one of the pawls away from the ratchet wheel while the remaining pawl is engaged with the teeth of the ratchet wheel; another control member on the frame settable in either one of two positions to position said lever means for selectively permitting either one of the two pawls to engage the ratchet wheel; and a slide bar arranged to hold both pawls away from the ratchet wheel, said first named control member being coupled to the slide bar to operate the same to permit the spool to rotate freely in playing out the line, whereby the reel can be held by the fisherman in either hand in upright and upside-down positions respectively for controllably playing out the line while his remaining hand can turn the spool to retrieve the line.

6. A reel as defined by claim 5, wherein the frame has openings at top and bottom thereof for passing the line therethrough when the reel is held in upright and upside-down positions respectively.

7. A reel as defined by claim 5, further comprising means coupling said other control member and said lever means for moving the lever means to permit either pawl to engage the ratchet wheel.

8. A reel as defined by claim 5, wherein the first named control member is slidably mounted on the frame; and locking means on the frame for holding said first named control member and said slide bar in a retracted position with both pawls held away from the ratchet wheel.

9. A reel as defined by claim 8, wherein the slide bar has camming edge portions arranged to engage the pawls for moving both pawls away from the ratchet wheel when the slide bar and first named control member are retracted toward the handle.

10. A reel as defined by claim 9, further comprising spring means in the frame normally urging said slide bar to disengage the pawls and permit either pawl to engage the ratchet wheel depending on the setting of said other control member.

References Cited
UNITED STATES PATENTS

| | | | |
|---|---|---|---|
| 1,543,489 | 6/1925 | Wilson | 242—96 |
| 2,312,262 | 2/1943 | Murdoch et al. | 242—99 |
| 2,862,679 | 12/1958 | Denison et al. | |
| 2,984,432 | 5/1961 | Clark | 242—84.53 X |

NATHAN L. MINTZ, Primary Examiner